US012332893B2

(12) United States Patent
Chaudhry et al.

(10) Patent No.: US 12,332,893 B2
(45) Date of Patent: Jun. 17, 2025

(54) METHOD AND SYSTEM TO IMPLEMENT SQL MACROS

(71) Applicant: Oracle International Corporation, Redwood Shores, CA (US)

(72) Inventors: Atif Chaudhry, Fremont, CA (US); Chandrasekharan Iyer, Redwood City, CA (US); Lei Sheng, Redwood City, CA (US); Agrawal Shashaanka, Hayward, CA (US)

(73) Assignee: Oracle International Corporation, Redwood Shores, CA (US)

( * ) Notice: Subject to any disclaimer, the term of this patent is extended or adjusted under 35 U.S.C. 154(b) by 56 days.

(21) Appl. No.: 16/571,007

(22) Filed: Sep. 13, 2019

(65) Prior Publication Data

US 2020/0125569 A1   Apr. 23, 2020

Related U.S. Application Data

(60) Provisional application No. 62/748,311, filed on Oct. 19, 2018.

(51) Int. Cl.
*G06F 16/2453* (2019.01)
*G06F 16/242* (2019.01)

(52) U.S. Cl.
CPC ...... *G06F 16/24547* (2019.01); *G06F 16/244* (2019.01); *G06F 16/2448* (2019.01); *G06F 16/24545* (2019.01)

(58) Field of Classification Search
CPC ............................................... G06F 16/24547
See application file for complete search history.

(56) References Cited

PUBLICATIONS

Oracle-Base, Efficient Function Calls From SQL, accessed Jan. 17, 2021 at https://oracle-base.com/articles/misc/efficient-function-calls-from-sql (Year: 2021).*
Feuerstein, On Cursors, Context Switches, and Mistakes, Aug. 2015, accessed Jan. 17, 2021 at https://blogs.oracle.com/oraclemagazine/on-cursors-context-switches-and-mistakes (Year: 2015).*
Myalapalli, Vamsi Krishna, and Muddu Butchi Shiva. "An appraisal to optimize SQL queries." 2015 International Conference on Pervasive Computing (ICPC). IEEE, 2015. (Year: 2015).*
Duta, Christian, Denis Hirn, and Torsten Grust. "Compiling PL/SQL Away." arXiv preprint arXiv:1909.03291 (2019). (Year: 2019).*
Bertrand, Four ways to improve scalar function performance in SQL Server, Jan. 11, 2019, accessed Jan. 17, 2021 at https://www.mssqltips.com/sqlservertip/5864/four-ways-to-improve-scalar-function-performance-in-sql-server/ (Year: 2019).*
LibreOffice, "Using Basic macro functions in SQL statements?", LibreOffice, (last updated Jun. 17, 2017).
Micro Focus, "Check Constraints", Vertica Analytics Platform, Version 8.1.x Documentation, Micro Focus, (Aug. 20, 2020).

(Continued)

*Primary Examiner* — William Spieler
(74) *Attorney, Agent, or Firm* — Vista IP Law Group, LLP

(57) ABSTRACT

Disclosed is an approach to define non-SQL functions as a SQL macro, which is then processed inline with SQL statements. By inlining the macro into SQL, this approach avoids cross-engine context switches as well as making it possible for a SQL query optimizer to generate better plans that execute more efficiently.

24 Claims, 19 Drawing Sheets

(56) References Cited

PUBLICATIONS

Micro Focus, "Create Function (SQL Functions)", Vertica Analytics Platform, Version 8.1.x Documentation, Micro Focus, (Aug. 20, 2020).
SAS Institute Inc., "SAS® 9.4 SQL Procedure User's Guide" SAS® Documentation, SAS Institute Inc., (Jul. 2013).
Adler, D. R. et al., "SAS/Access® Interface to Teradata", White Paper, (Dec. 15, 2000).

* cited by examiner

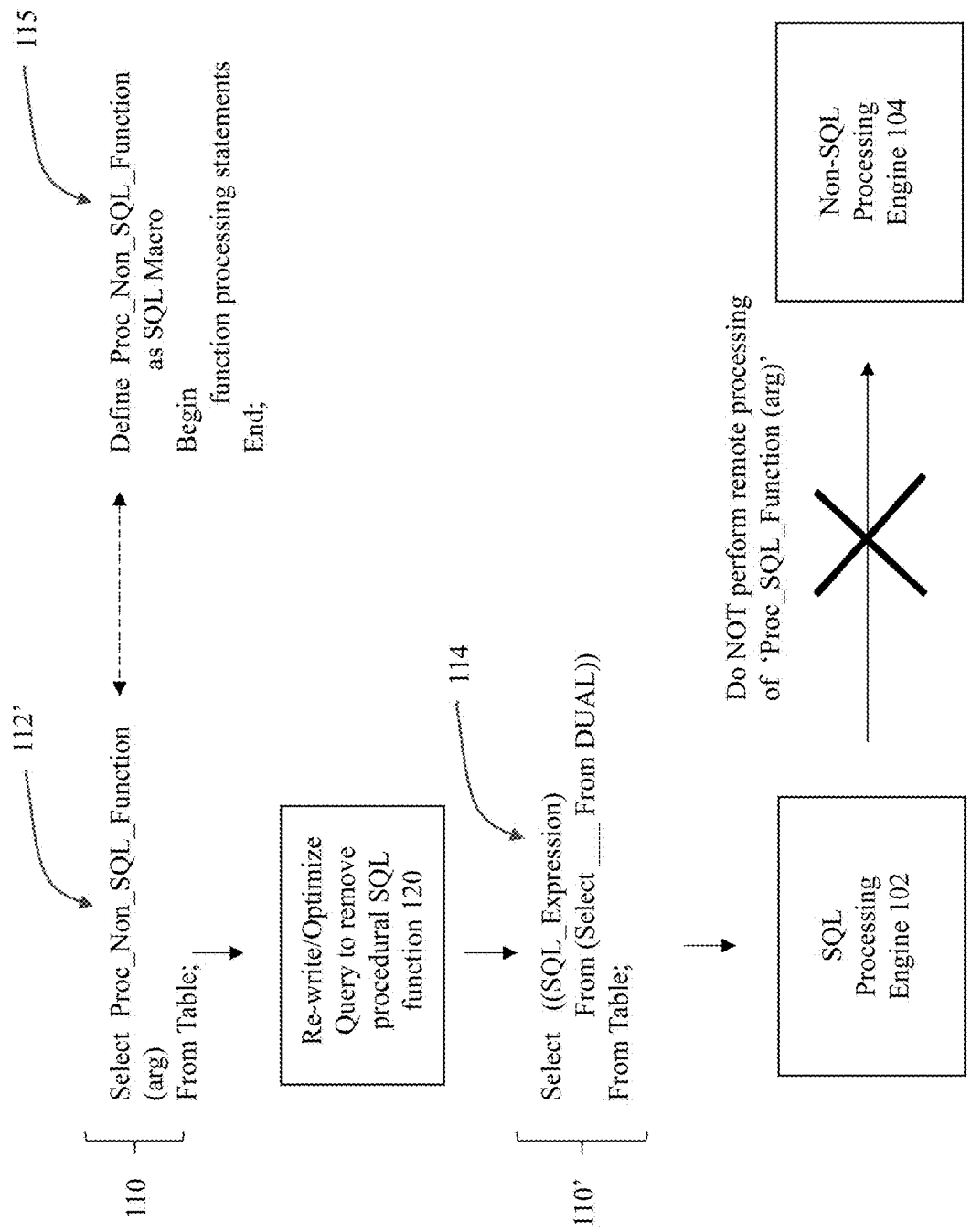

```
select deptno, clip(:glb,(select avg(sal)
from emp
where deptno=d.deptno), :lub)
from dept;
```

Fig. 6B

```
select deptno, (select (least(greatest(x, lo), hi)) as c1
    from (select :glb as lo,
          (select avg(sal)
           from emp
           where deptno=d.deptno) as x,
          :lub as hi
         from dual)))
from dept;
```

Fig. 6C

```
select deptno,
    least(greatest((select avg(sal)
        from emp
        where deptno=d.deptno),:glb),:lub)
from dept;
```

Fig. 6D

```
(with <ft1> as (select * from <at1>)

...

<ftk> as (select * from <atk>)

select " ___$", *, from (select <as1>as<fs1>,..., <ask>as<fsk> from dual) <F>, lateral(<macro-generated-sql-string>) " ___$")
```

Fig. 7A

```
select *
from (with t as (select * from sh.sales)
    select " __ $",.*
    from (select :samp_pct as pct from dual) sample,
    lateral(select * from t
        where dbms_random.value <= sample.pct/100)
" __ $");
```

Fig. 7C

METHOD AND SYSTEM TO IMPLEMENT SQL MACROS

CROSS-REFERENCE TO RELATED APPLICATIONS

The present application claims the benefit of priority to 62/748,311, filed on Oct. 19, 2018, which is hereby incorporated by reference in its entirety.

BACKGROUND

Interactions occur with a database by submission of commands that cause the database to perform operations on the database data. For the database server to process the commands, the commands typically conform to a database language supported by the database server. An example of a commonly used database language supported by many database servers is known as the Structured Query Language (SQL).

When a database server receives the original statement of a database command (e.g., from a database application), the database server must first determine which actions should be performed in response to the database command, and then perform those actions. A query processor may process the database statement to prepare the acts necessary for performance of the desired actions within the database. The initial action to analyze and break the database statement into its constituent parts may be referred to as "parsing" the database command. "Compilation" of the database command may then be performed to create the specific composition and sequence of actions to take against delineated set(s) of database objects, as well as code generation that may be necessary to create an executable version of the database statement. Since there may be multiple alternative processing paths that can be taken to achieve the same result within a database, "optimization" may be performed to identify specific processing paths that can be selected to improve the efficiency of processing for the database command. The actual performance of the actions applied to the database is generally referred to as "executing" the database command.

Database applications (such as relational database management system or "RDBMS" applications) routinely need to write functions that are then used in SQL statements. Typically, the language used for these functions is different than the SQL expression language. For example, various extensions to the SQL language have been implemented, such as PL/SQL or SQL/PSM, in order to provide procedural functionality for SQL-based applications. Other types of languages, such as JAVA or C, have also been used to create functions that are usable within a SQL query.

When a non-SQL function is used in conjunction with a SQL query, the difference in the languages will cause two or more different evaluation engines to interoperate with each other, where a first evaluation engine handles the SQL portion of the query and a second evaluation engine handles the non-SQL portion of the query. For example, a SQL virtual machine (VM) may be employed to handle the SQL portion of the query, while a PL/SQL or Java VM is employed to handle the respective PL/SQL or Java functions within the query.

However, the multiple evaluation engines will operate by treating each other like black boxes with data being passed between them. One problem with this approach of treating each other like black boxes is that, since these engines appear as black boxes to each other, it becomes very difficult if not impossible to adequately optimize the interactions between them. This may therefore also lead to suboptimal plan generation for the SQL queries. In addition, using the multiple evaluations with each other and the requirement to pass data between them will cause poor performance for database processing, e.g., due to the overhead of making calls between the engines (such as remote procedure calls or RPCs) and/or additional overhead due to context switching between the engines.

What is needed, therefore, is a method and/or system that overcomes these problems, and which more efficiently implements interactions between SQL and non-SQL statements in a database system.

SUMMARY

Embodiments of the present invention provide a system, method, and computer program product of an approach to define non-SQL functions as a SQL macro, which is then processed inline with SQL statements. By inlining the macro into SQL, this approach avoids cross-engine context switches as well as making it possible for a SQL query optimizer to generate better plans that execute more efficiently.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 1B illustrates an improved approach whereby the non-SQL function is implemented as a SQL macro.

FIGS. 6A-6D illustrate scalar expression transformations.

FIGS. 7A-7D illustrate table expression transformations.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Embodiments of the present invention provide a system, method, and computer program product of an approach to define non-SQL functions as a SQL macro, which is then processed inline with SQL statements. By inlining the macro into SQL, this approach avoids cross-engine context switches as well as making it possible for a SQL query optimizer to generate better plans that execute more efficiently.

For purposes of illustration, various embodiments of the invention may be described with respect to PL/SQL functions as examples of non-SQL functions that may be used in conjunction with SQL. Therefore, various embodiments of the present invention provide and disclose a system, method, and computer program product that allows use of PL/SQL package mechanism to define macros which leverages a PL/SQL language module mechanism. By inlining the macro into SQL, this approach avoids cross VM switches as well as making it possible for SQL query optimizer to generate better plans that execute more efficiently. It is noted, however, that the inventive concept is not limited only to PL/SQL, and indeed, may be employed in conjunction with any suitable processing/programming language.

Figure 1A:
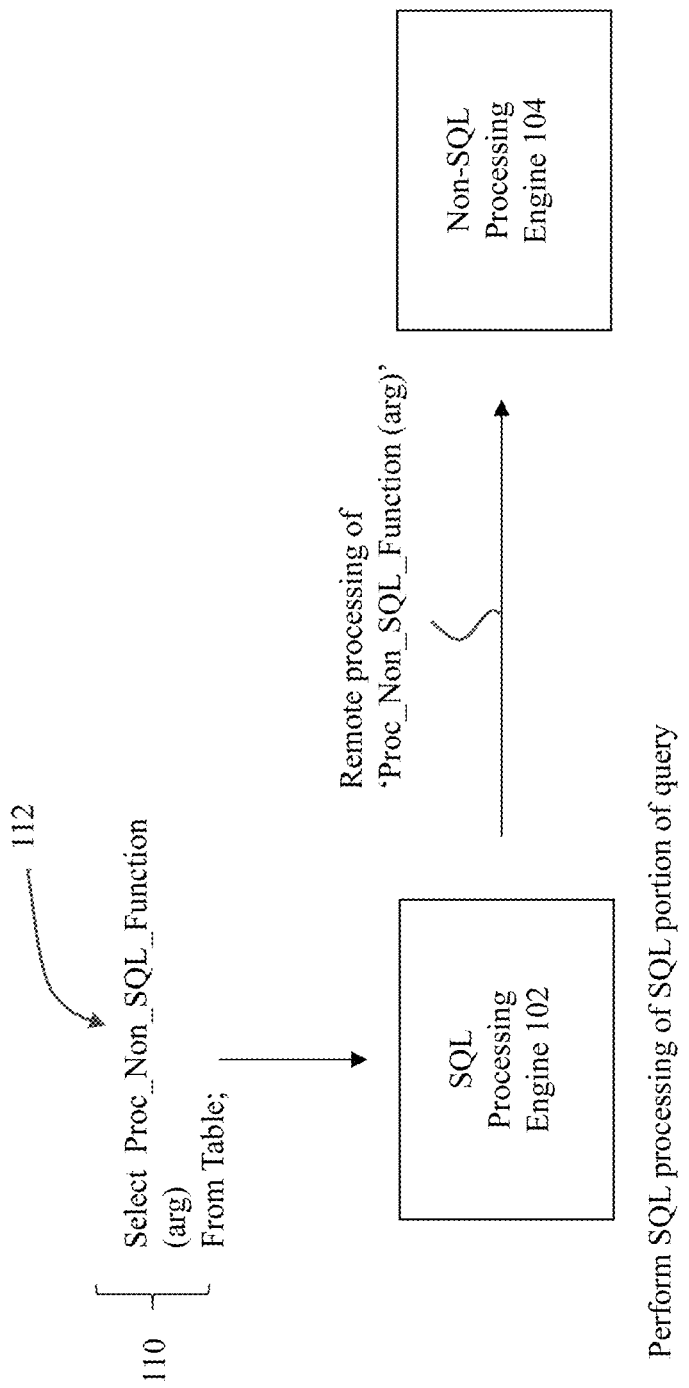
FIG. 1A illustrates when a non-SQL function is used in conjunction with a SQL statement.

As discussed above and as illustrated in FIG. 1A, when a non-SQL function 112 is used in conjunction with a SQL query 110, a non-optimal solution is to use two or more different evaluation engines to interoperate with each other. As shown in this figure, a first evaluation engine 102 handles the SQL portion of the query and a second evaluation engine 104 handles the non-SQL portion of the query. These engines may be implemented, for example, as separate virtual machines in a virtualization environment. One problem with this approach is that engine 104 appears as a black box to engine 102, and hence the database optimizer that handles the SQL processing will be unable to adequately optimize the overall database processing or the interactions between the two engines. This may lead to the generation of a suboptimal execution plan for the SQL statement 110. In addition, performance for the database processing may be negatively affected by the need to perform RPCs between the two engines, as well as the overhead to perform context switching when switching from one engine to the other.

FIG. 1B illustrates an improved approach whereby the non-SQL function 112' is implemented as a SQL macro 115. A SQL macro is a set of statements that are defined to a database system by a macro name. Conventionally, a database system can execute a SQL macro when the macro is selected, e.g., when the macro is called by name from within a SQL statement. The database system would then perform an execution of the statements associated with the macro. In embodiments of the current invention, the SQL macro mechanism is used to tie the intended operations of the non-SQL function into a form that would be executable as a native SQL statement.

In some embodiments, when a name resolution hard-parse is performed on the SQL statement 110, the database system can recognize that the function 112' is a non-SQL function (e.g., PL/SQL function), and an additional check is made whether the function is a SQL macro. If the function 112' is of type SQL_MACRO, then as described in more detail below, the SQL macro text will be obtained from macro 115. The original SQL statement 110 having the non-SQL function is then rewritten (at 120) into a revised SQL statement 110' that no longer includes a non-SQL function. Instead, the revised SQL statement 110' includes one or more SQL expressions 114 that performs the functionality of the non-SQL function. The SQL macro text is implemented using any suitable combination of SQL expressions to accomplish the desired functionality.

The SQL processing engine 102 is then used to process the SQL statement 112'. Since the statement 112' no longer includes a non-SQL function, this means that the second processing engine 104 does not need to be called to process the SQL statement. Instead, the entire statement can be processed with just the SQL processing engine 102.

This approach therefore permits efficient and effective optimization of the database statement, since only the one processing engine 102 is needed to process the statement. In addition, performance improvements are achieved since there is no longer the need to perform RPCs between the two engines, as well as elimination of overhead to perform context switching when switching between multiple engines.

Figure 2:
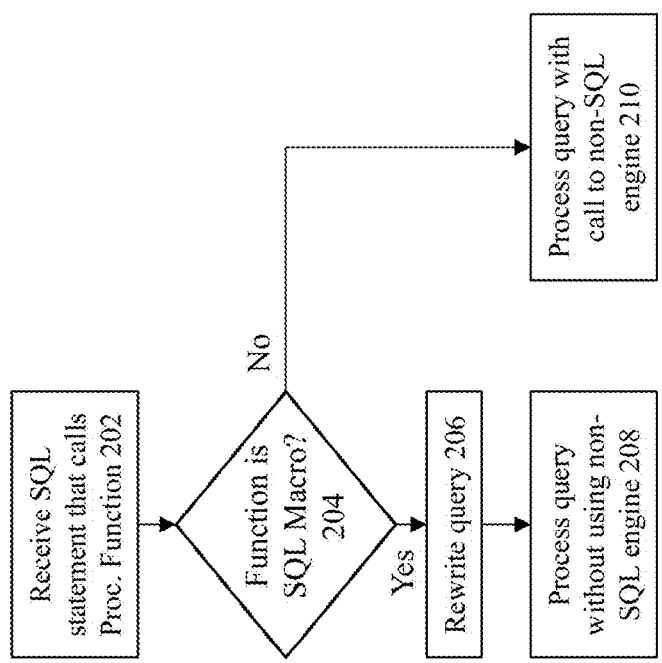
FIG. 2 shows a flowchart of an approach to implement some embodiments of the invention.

FIG. 2 shows a flowchart of an approach to implement some embodiments of the invention. At 202, a SQL statement is received that calls a non-SQL function. The non-SQL function may include any type of function that is definable as a SQL macro. For example, the non-SQL function may be implemented as a PL/SQL function or a SQL/PSM function.

At 204, a determination is made whether the function is defined as a SQL macro. In some embodiments, the database processing code checks if a SQL_MACRO bit is set for the function. If the function is not of type SQL_MACRO, then multiple processing engines are employed to handle the SQL application. Therefore, a SQL processing engine is used to process the SQL-specific statements and at 210 a non-SQL processing engine is used to process the non-SQL function.

If, however, the function is of type SQL_MACRO, then at 206, the query will be rewritten using SQL expression(s) in-place of the non-SQL function. In particular, the text will be obtained from SQL macro, and one or more functionally equivalent SQL expressions are inserted with the appropriate column/table identifiers and suitably generated return strings to provide the correct processing results as if the non-SQL functions are executed.

Thereafter, at 208, the rewritten query is processed using only the SQL processing engine. Since the rewritten query no longer includes the non-SQL function, this means that no calls need to be made to the non-SQL processing engine.

Figure 3:
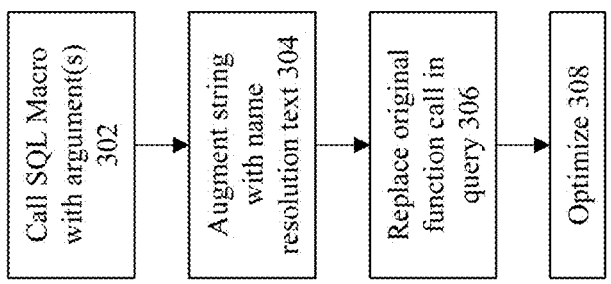
FIG. 3 shows a flowchart that provides a more detailed description for some embodiments of the invention to construct the new string for the rewritten query.

FIG. 3 shows a flowchart that provides a more detailed description for some embodiments of the invention to construct the new string for the rewritten query. After identifying the PL/SQL function as a SQL macro, then at 302, the SQL macro is called with the arguments from the SQL query. The SQL string is then returned back from the call to the SQL macro.

Next, at 304, the string is augmented with name resolution text from the SQL query. For instance, the specific column(s) and table(s) referenced in the query are used to augment the SQL text constructed from the SQL macro. At 306, the SQL macro string is parsed, and the original function call in the original query is then replaced by the new query block. Thereafter, at 308, one or more optimizations may be applied to the rewritten query, as illustrated in more detail below.

In effect, the approach takes the return value(s) text from the SQL macro as a string, and then builds a new SQL statement that is fully self-contained that does not require a call to the original non-SQL function. If the actual parameters are binds, correlated columns, or scalar sub-queries, then NULL will be passed in, otherwise the actual literal value specified in the query will be passed in.

FIGS. 4A-D provide an illustrative example for the inventive process.

Figure 4A:
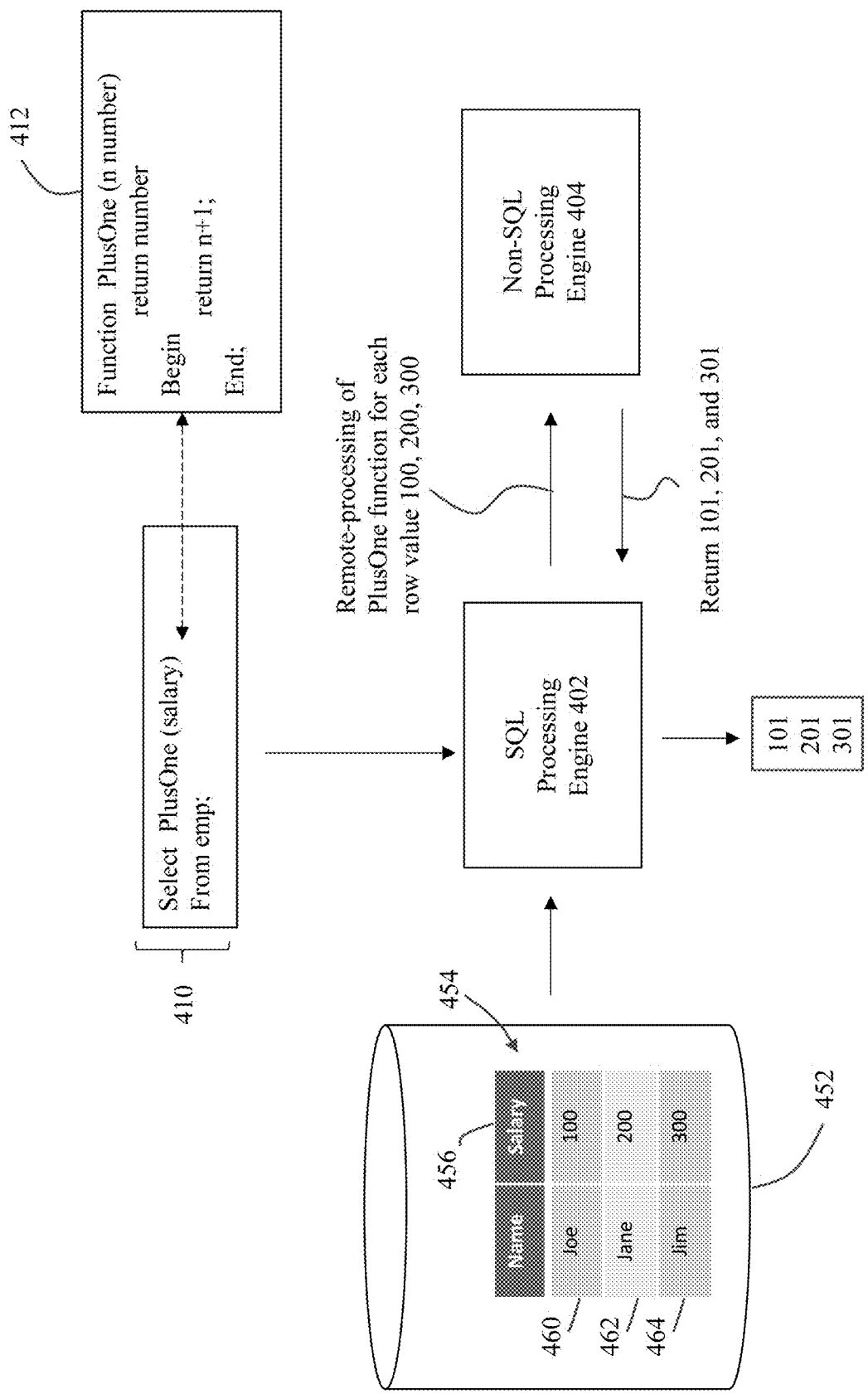
FIGS. 4A-4D provide an illustrative example for the inventive process.

FIG. 4A shows a SQL query 410 that includes a non-SQL function 412. In particular, the non-SQL function 412 corresponds to the function "PlusOne" which takes a number n as an input, and returns a value "n+1". This function 412 is included in the SQL query 410, which calls the function 412 with column "salary" as the input to the function from the table "Emp".

Table Emp is shown as table 454 in database 452, with this table having two column "Name" and "Salary". The SQL processing engine 402 is used to process the SQL-based portions of the query, and this SQL processing engine 402 interoperates with the non-SQL processing engine 404 to handle the non-SQL portions of the query (the non-SQL function 412). In particular, the values in the "Salary" column 456 for each of the rows (value 100 from row 460, value 200 from row 462, value 300 from row 464) are retrieved from the table 454, which are then passed from the first processing engine (SQL processing 402) to the second processing engine (non-SQL processing engine 404). The non-SQL processing engine 404 would then execute the function 412 as indicated (to add 1 to each of the input values) and then provide the return values back to the SQL processing engine 402 ((100+1)→101, (200+1)→202, (300+1)→302).

As previously noted, this approach is problematic since the second processing engine 404 appears as a black box to the first processing engine 402, and takes a performance hit due to the need to perform remote processing between the two engines.

Figure 4B:
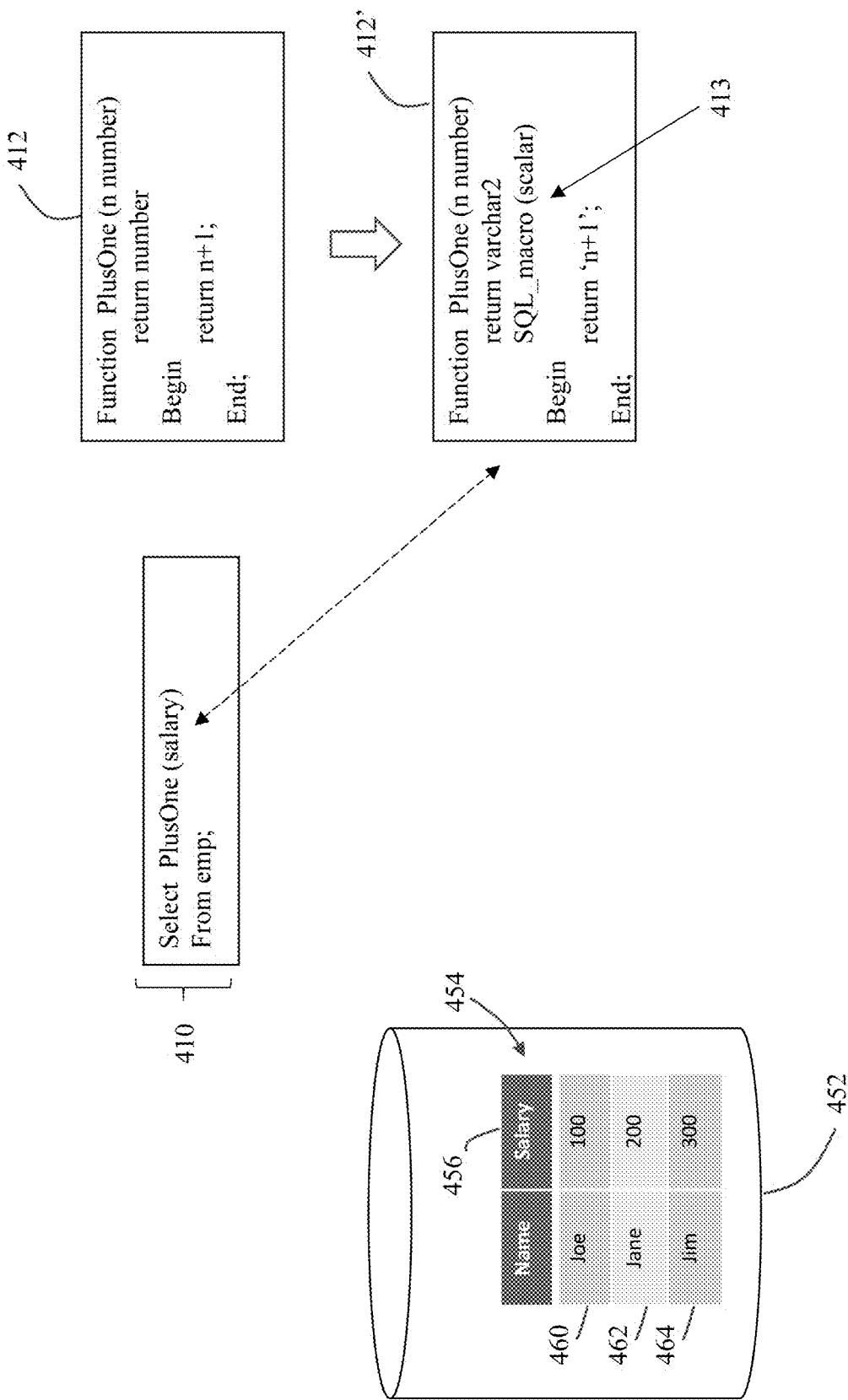

FIG. 4B shows an improved approach whereby the function 412 is instead defined as a SQL macro. Here, the revised function 412' includes a statement 413 that identifies the function 412' as a SQL macro. In this particular case, the SQL macro pertains to a scalar expression. As discussed in more detail below, the SQL macros may correspond to different types of expressions, such as scalar expressions and/or table expressions. The definition of the function as a SQL macro is identified by database processing system, and initiates rewriting of the SQL query.

Figure 4C:
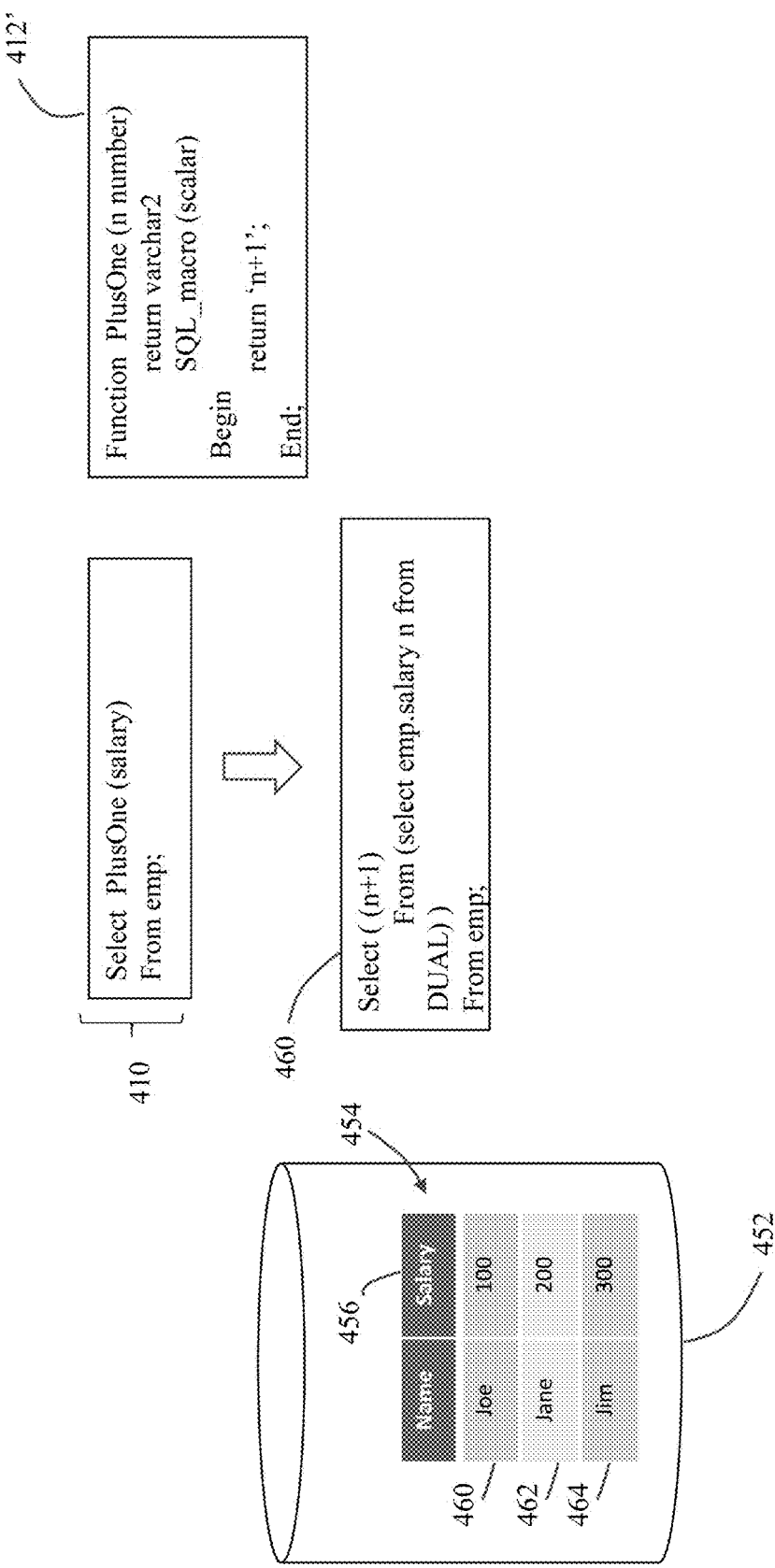

FIG. 4C illustrates how the original SQL query can be rewritten in some embodiments. In this particular case, the return string "n+1" is retrieved from the SQL macro, and a name binding is performed to the particular expression in the revised SQL query 460, where the binding is to the specific attributes/columns that are referenced in the original SQL query 410.

This results in the construction of a SQL expression "Select (n+1) . . . " having the return string from the SQL macro 412'. The "From" clause of the SQL expression is revised to include another "select" statement as follows: " . . . From (select emp.salary n from DUAL)". Here, the select statement refers to the "salary" column 456 that is tied to the variable n, which binds to the column referred to in the original SQL query 410. This is in effect the argument(s) that are taken from the original SQL query to construct the new SQL expression.

The " . . . from DUAL" clause is a construct that refers to a one column dummy table that may be used in certain database systems for handling internal database views. For example in database systems provided by Oracle Corporation, DUAL refers to a special one row, one column table presented by default in all Oracle databases where the table has a single VARCHAR2(1) column called DUMMY that has a value of 'X'. The MySQL database system also allows DUAL to be specified as a table in queries that do not need data from any tables. In SQL Server systems, the DUAL table does not exist, but one can be created for the same purpose as discussed above. Here, the dummy table is provided to effect a view to hold processing data for processing the rewritten return text into a statement in the context of the SQL query.

Figure 4D:
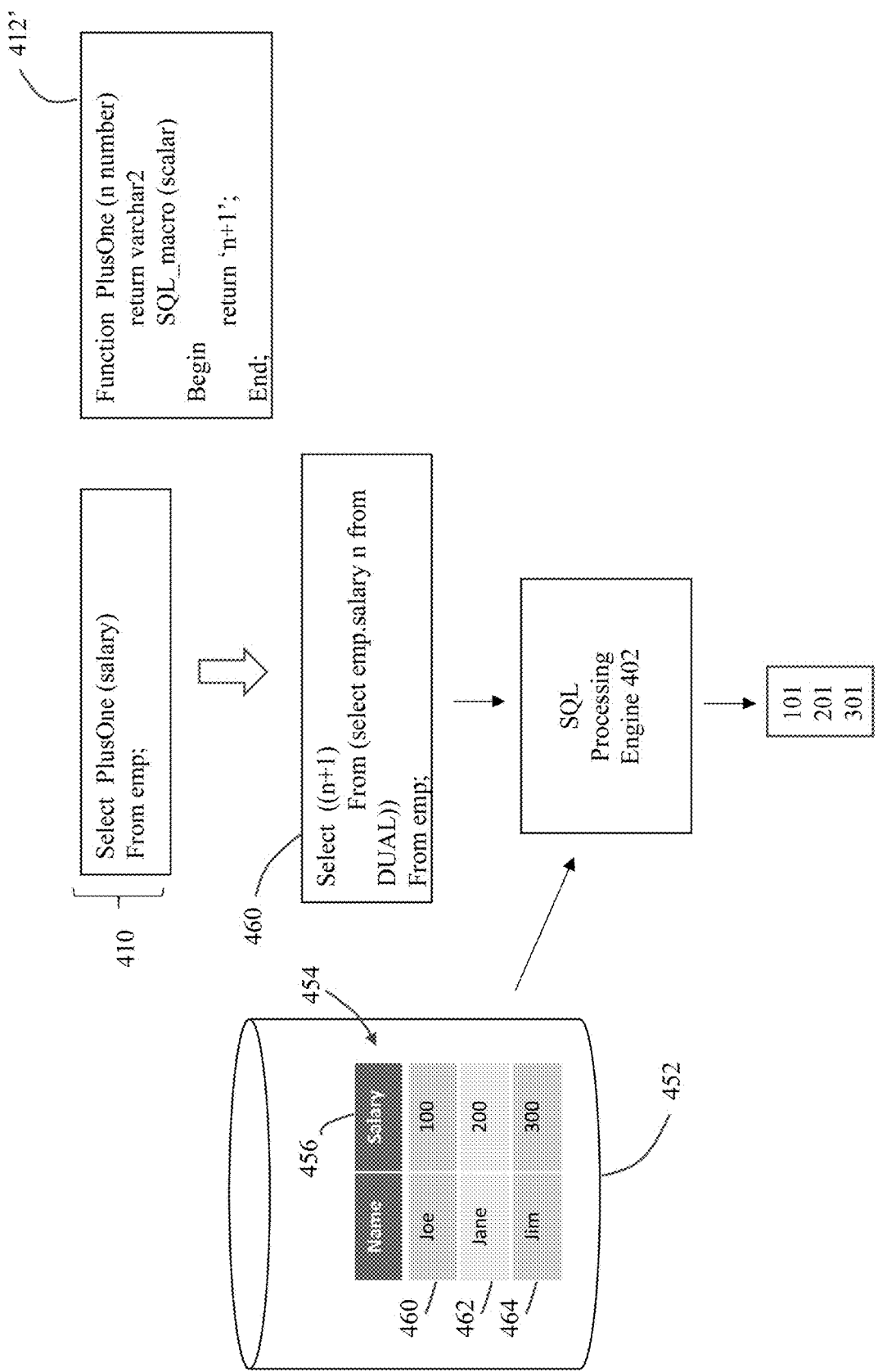

The result of the query rewriting is that the revised query 460 no longer includes a non-SQL function. Instead, the query 460 includes only native SQL expressions. As illustrated in FIG. 4D, this means that the query 460 can be processed using the SQL processing engine 402 by itself—without needing to call another processing engine for the non-SQL function that was removed from the query.

One or more optimizations may be implemented for the rewritten query, e.g., where artifacts in the SQL expression that remain from the non-SQL function and/or from the rewriting process are removed if unnecessary to the correct functioning of the SQL expressions.

Figure 5:
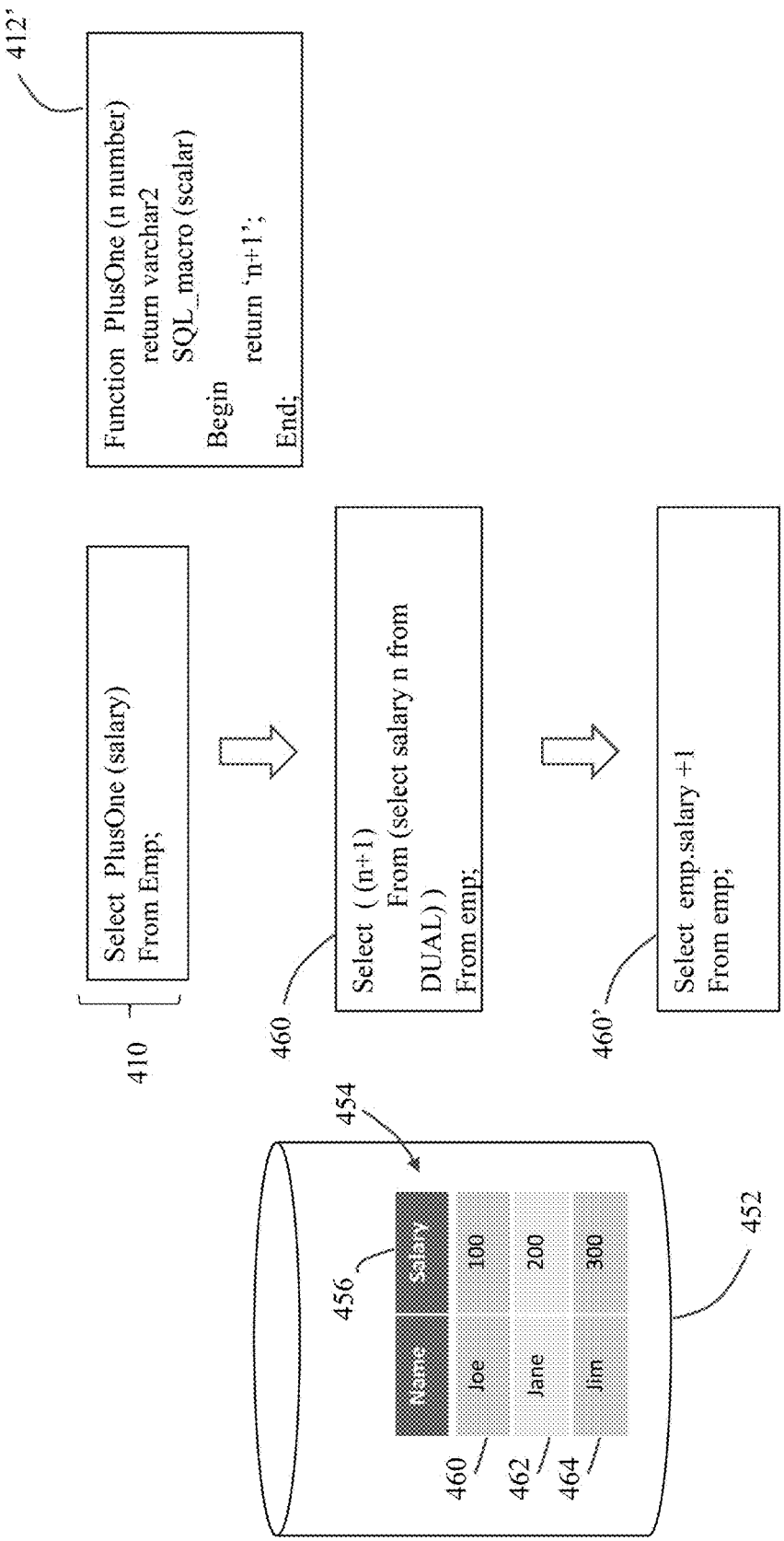
FIG. 5 illustrates certain optimizations that may be applied to a query.

For example, the rewritten query 460 includes the reference to the dummy table "DUAL". If appropriate, the SQL expression can be optimized to remove the reference to the dummy table. Here, as illustrated in FIG. 5, since the SQL expression in query 460 does not need to functionally depend on the existence of the DUAL table, the optimized query 460' removes the reference to the DUAL table. In addition, optimizations may be performed to remove references within the return string and replace those references with actual names/attributes from the query. For example, query 460 includes the return string "n+1", which actually resolves to "emp.salary +1" since the value of n corresponds to the values from the "salary" column of the "emp" table.

As noted above, the transformation that is applied may be specific to the type of expression that needs to be processed. The next sections of this disclosure will provide detailed descriptions of approaches to perform transformations of scalar expressions and table expressions according to certain embodiments of the invention.

Scalar Expressions

Figure 6A:
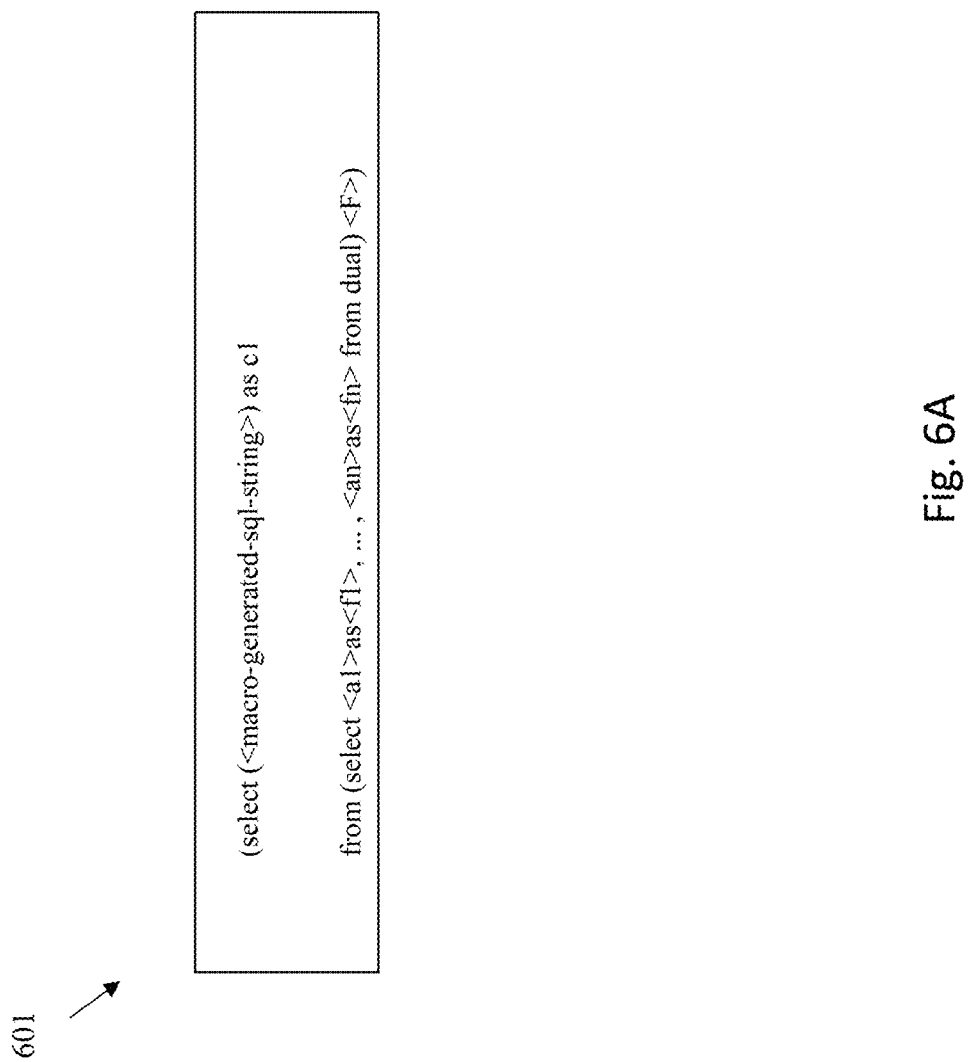

For scalar expressions (e.g., those which show up in the select-list, where, group by, and having clauses) the transformation is as follows: Suppose the macro function, <F>, returns the string <macro-generated-sql-string>, then the macro invocation with actual parameters <a1> . . . <an> are replaced as illustrated by example 601 in FIG. 6A. It is noted that the replacement approach can be implemented in the same or similar way that any view text can replace the reference to the view and then recursively parsed.

This approach is taken where <a1> . . . <an> are the actual parameters while <f1> . . . <fn> are the formal parameters. If the actual parameter <ak> is being defaulted then it is still represented in the generated query block with: "<defaultk> as "<ak>". This rewrite is applicable even if the generated query blocks are not removed, but the code is rewritten to remove the two generated query blocks (e.g., with post name resolution).

FIG. 6B provides an illustrative example of how this would work for the example of a "clip" macro invoked on the query 602. Query 602 will be rewritten (in textual form) as shown for rewritten query 602' as shown in FIG. 6C, using the approach described above. The code returned by the macro generating function is the following: "least(greatest(x, lo), hi)". The generated code which brackets that code returned by the macro generating function is the following:

```
(select ( <code returned by macro> )) as c1
from (select :glb as lo,
    (select avg(sal)
    from emp
    where deptno=d.deptno) as x,
    :lub as hi
    from dual))
```

The wrapped macro expanded text will then be fed to a parser to convert it into query blocks (e.g., using a processing approach that can be used to obtain view text from view$). The query blocks will then be processes as a regular scalar subquery block. After the name resolution completes successfully, the approach can then strip out the inserted query blocks and end up with the query 602" shown in FIG. 6D.

Table Expressions

The transformation for table expressions is fairly similar to the one outlined above for scalar expression, with the main difference for macros returning table expressions is that they should be configured as "from-clause" views. Suppose the macro function <V>>, returns the string <macro-generated-sql-string>, then the macro invocation with is called with the actual table parameters <at1> . . . <atk> and actual scalar parameter <as1> . . . <asp>, then the macro invocation is replaced by the from-clause/inline view 702 as shown in FIG. 7A.

Similar to the above discussion about scalar expressions in the previous section, <ft1> . . . <ftk> are the formal table parameters and <fs1> . . . <fsp> are the formal scalar parameters, plus the defaulted parameters are represented in the replacement expression even if the SQL query did not specify them. A technical restriction may be applicable in certain circumstances where table valued parameters do not have default values, In addition, the approach of representing the query holding the scalar valued parameter is lateral joined as opposed to expressed as a with-clause is an optional action that may be avoided in some embodiments.

Figure 7B:
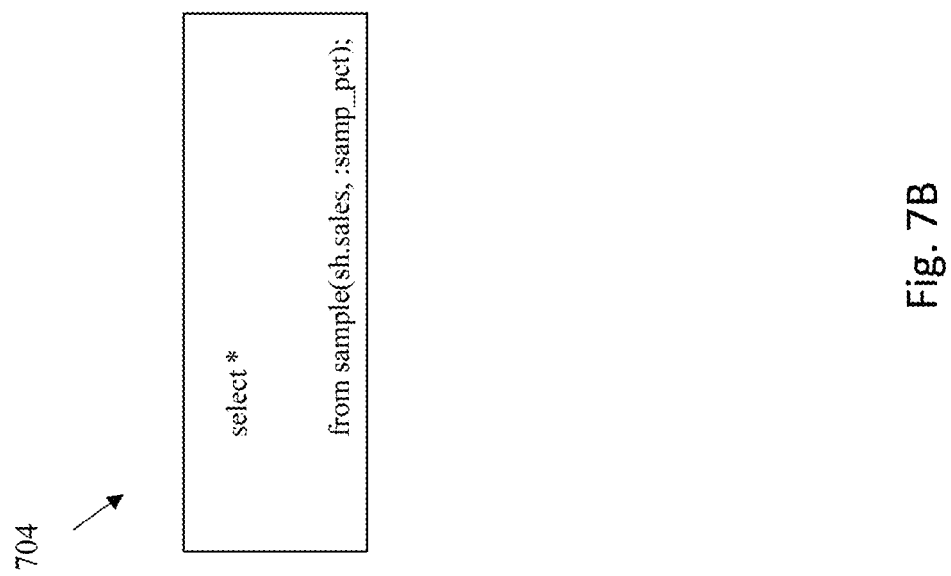

Consider again this transformation with a simple example. FIG. 7B illustrates an example for decorating any table with a sampling predicate. During semantics analysis, this query will be rewritten (in textual form) as shown in example, 705 of FIG. 7C.

The code returned by the macro generating function is the following: "select * from t where dbms_random.value<=sample.pct/100". The generated code which brackets that returned macro code is the following:

```
(with t as (select * from sh.sales)
select "___$".*
from (select :samp__pct as pct from dual) sample,
    lateral( <returned macro code> ) "___$")
```

Figure 7D:
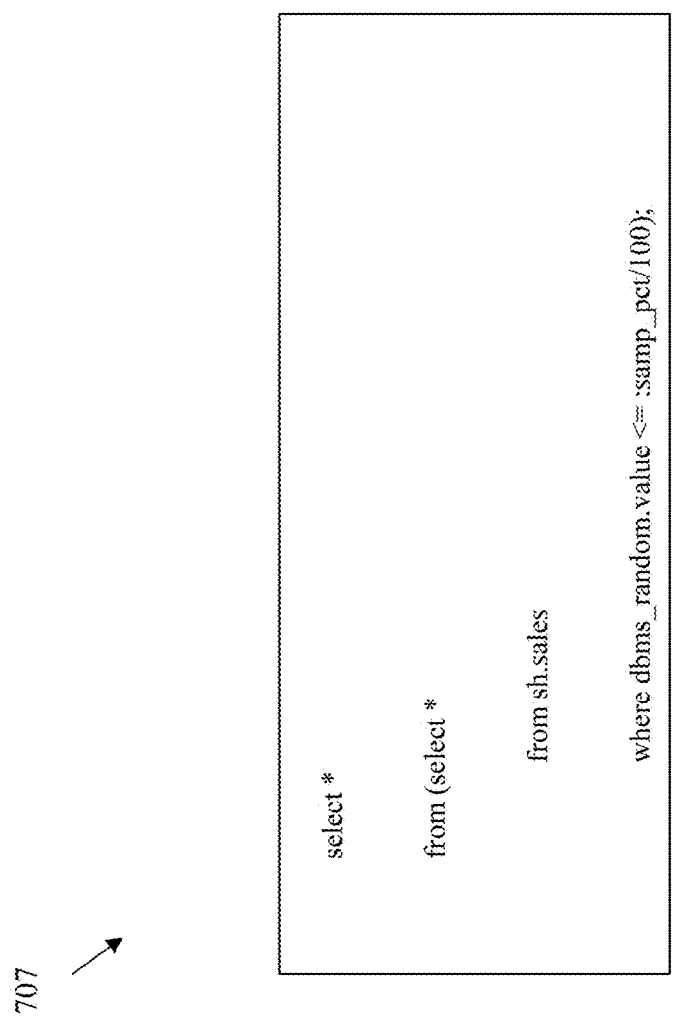

This wrapped macro expanded text will then be fed to a parser to convert it into query blocks (just as view text obtained from view$ is processed). The query blocks will then be processed as a regular scalar subquery block. After the name resolution completes successfully, the approach will strip out the inserted query blocks (since the optimizer may be unable to do it) and end up with the query 707 shown in FIG. 7D.

It is noted that the rewritten SQL query for scalar expressions and table expressions may be somewhat different. The SQL compiler will be able to distinguish these two cases based at least on where the SQM is called (if from the FROM-clause or elsewhere).

Therefore, what has been described is an improved approach for handling non-SQL functions, where a non-SQL function is implemented as a SQL macro. This permits the database system to process the functionality of the non-SQL function inline with SQL-language statement in a SQL query. This approach avoids cross-engine context switches as well as making it possible for a SQL query optimizer to generate better plans that execute more efficiently.

System Architecture Overview

Figure 8:
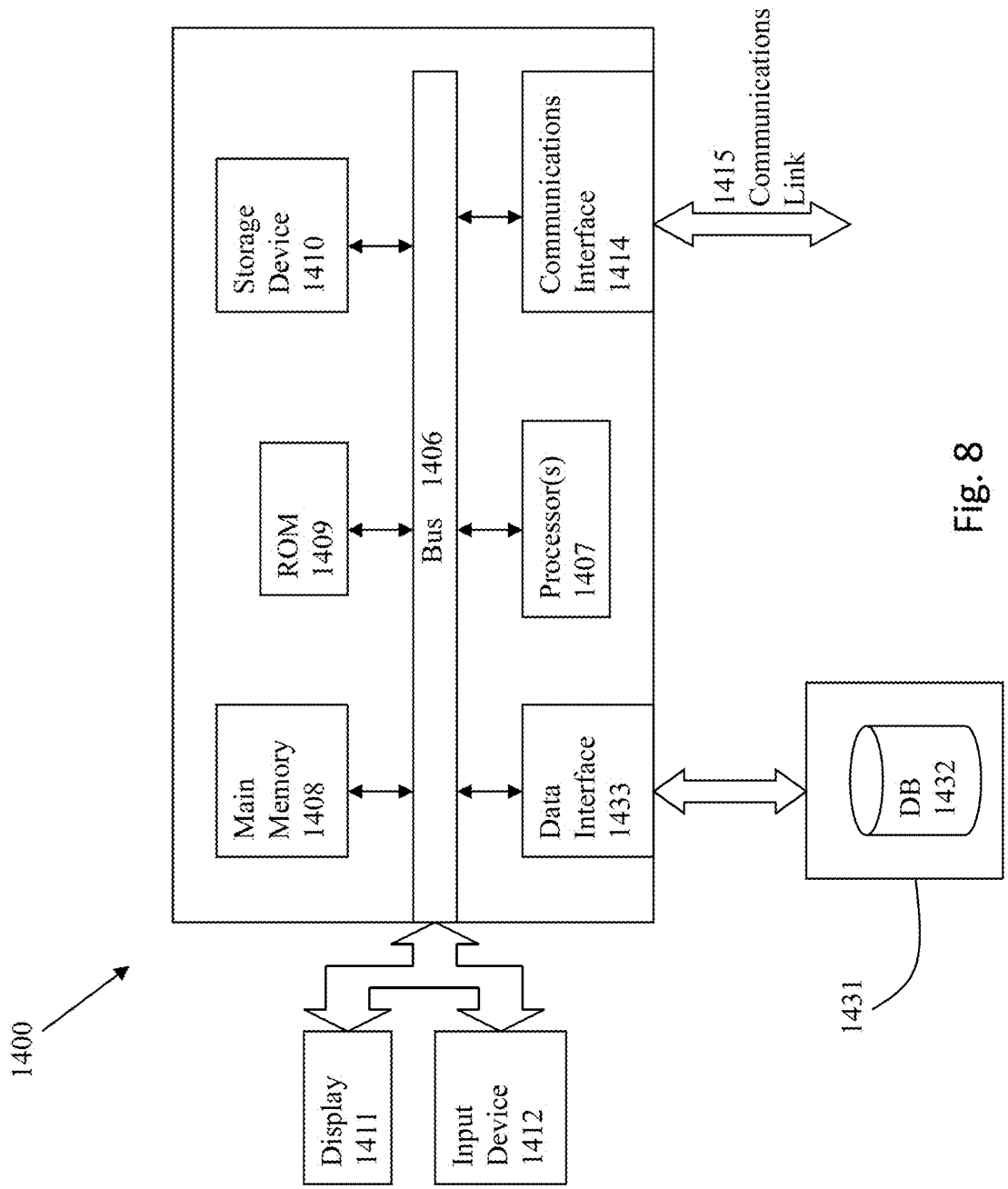
FIG. 8 is a block diagram of an illustrative computing system suitable for implementing an embodiment of the present invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 9:
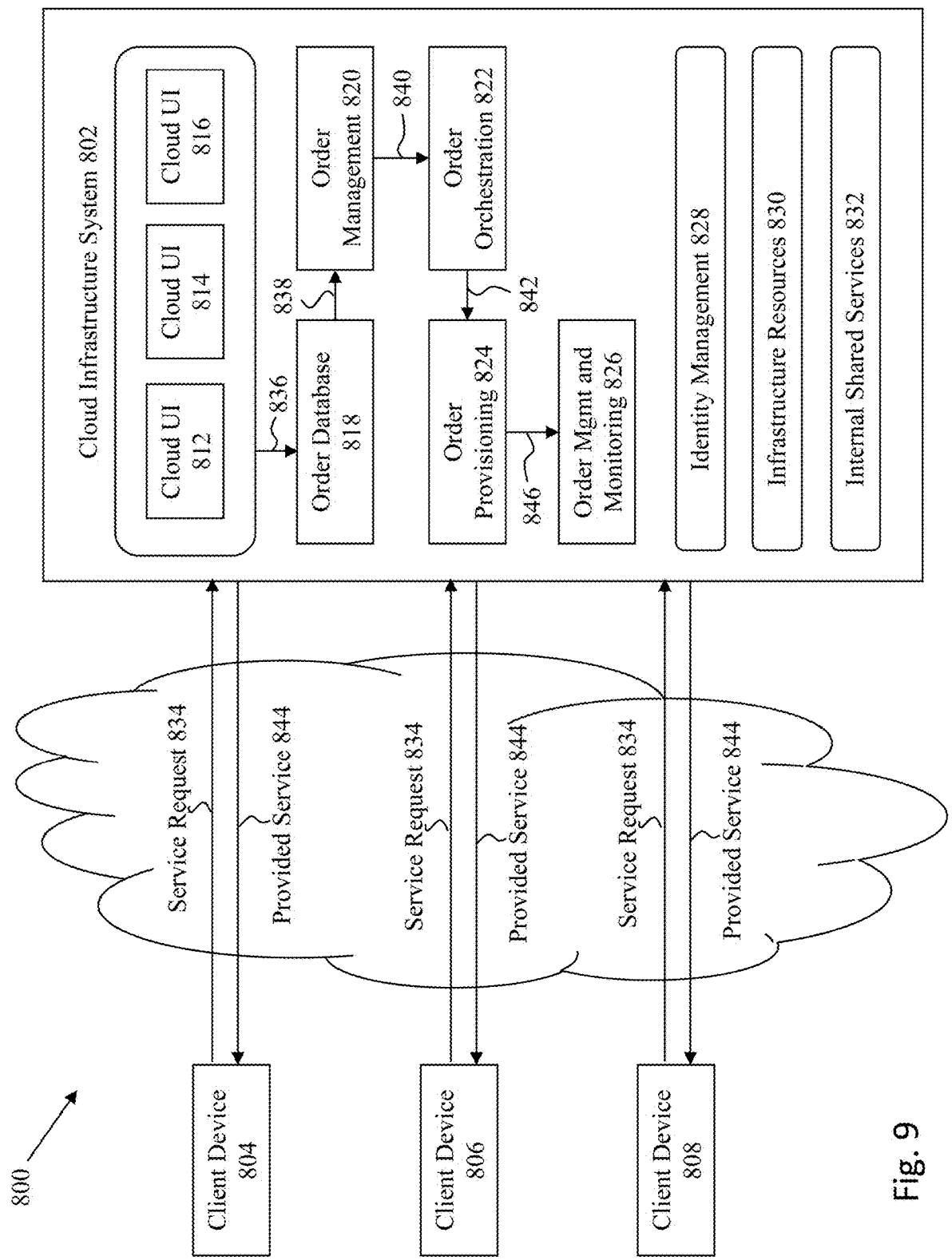
FIG. 9 is a block diagram of one or more components of a system environment in which services may be offered as cloud services, in accordance with an embodiment of the present invention.

FIG. 9 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 1. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method, comprising:
    maintaining a database system comprising at least a database server and a database, wherein the database system processes SQL queries having SQL statements and one or more non-SQL functions against one or more tables in the database based on at least whether corresponding non-SQL functions are to be converted by the database server into replacement SQL functions, the database server includes at least a query processor, an SQL processing engine that processes SQL statements, and one or more non-SQL processing engines that process one or more non-SQL statements; and
    receiving an SQL query to be processed inline at the database server and from a database application connected to the database server over a network, wherein the SQL query includes a non-SQL function that specifies an operation on one or more values in a table of the one or more tables, and the query processor determines that the non-SQL function in the SQL query is to be converted by the query processor into a form that is processable by the SQL processing engine based on at least the non-SQL function comprising a scalar expression or a table expression, and processing the SQL query inline at the database server by:
        executing, without performing a cross-engine context switch between the SQL processing engine and the non-SQL processing engine, the SQL query by the SQL processing engine, wherein:
        responsive to determining that the non-SQL function corresponds to an SQL macro that pertains to a scalar expression:
            retrieving a return string from the non-SQL function corresponding to the SQL macro,
            processing the return string to construct at least a select statement that is configured to select referenced content from a corresponding table, and
            replacing the non-SQL function in the SQL query with the select statement that is configured to select the referenced content from the corresponding table; and
        responsive to determining that the non-SQL function corresponds to an SQL macro that pertains to a table expression:
            retrieving a return string from the non-SQL function corresponding to the SQL macro,
            processing the return string to construct at least a from statement that is configured to select relevant content from a corresponding table, and
            replacing the non-SQL function in the SQL query with a from statement that is configured to select the relevant content from the corresponding table.

2. The method of claim 1, wherein the non-SQL function comprises a table expression.

3. The method of claim 1, wherein the non-SQL function comprises a scalar expression.

4. The method of claim 1, wherein a SQL optimizer optimizes the SQL query having the replacement SQL function.

5. The method of claim 1, wherein the non-SQL function comprises at least a scalar expression that operates on at least a first subset of the table in the database corresponding to the database server, or the non-SQL function comprises at least a table expression that operates on at least a second subset of the table in the database corresponding to the database server.

6. The method of claim 1, wherein the select statement that is configured to select referenced content from a corresponding table comprises at least a reference to a dummy table.

7. The method of claim 1, wherein the from statement that is configured to select relevant content from a corresponding table comprises at least a reference to a dummy table.

8. The method of claim 1, wherein determining, by the query processor, whether the non-SQL function in the SQL query is to be converted by the query processor into a form that is processable by the SQL processing engine is based on a type of the non-SQL function that corresponds to at least one of a PL/SQL function, a SQL/PSM function, a Java function or a C function.

9. The method of claim 1, wherein the SQL query is received at the database server in response to a user interaction with a client device, and the database server is maintained within a cloud infrastructure system that is accessible by a user over a computer network.

10. The method of claim 1, wherein the non-SQL processing engine the SQL processing engine are separate and processing the non-SQL function using the non-SQL processing engine requires one or more remote procedure calls between the SQL processing engine and the non-SQL processing engine, and the replacement SQL function is processed using the SQL processing engine without transmitting a remote procedure call to the non-SQL processing engine.

11. A system, comprising:
a processor;
a memory for holding a set of instructions; and
wherein the set of instructions, when executed by the processor, causes a set of acts comprising:
maintaining a database system comprising at least a database server and a database, wherein the database system processes SQL queries having SQL statements and one or more non-SQL functions against one or more tables in the database based on at least whether corresponding non-SQL functions are to be converted by the database server into replacement SQL functions, the database server includes at least a query processor, an SQL processing engine that processes SQL statements, and one or more non-SQL processing engines that process one or more non-SQL statements; and
receiving an SQL query to be processed inline at the database server and from a database application connected to the database server over a network, wherein the SQL query includes a non-SQL function that specifies an operation on one or more values in a table of the one or more tables, and the query processor determines that the non-SQL function in the SQL query is to be converted by the query processor into a form that is processable by the SQL processing engine based on at least the non-SQL function comprising a scalar expression or a table expression, and processing the SQL query inline at the database server by:
executing, without performing a cross-engine context switch between the SQL processing engine and the non-SQL processing engine, the SQL query by the SQL processing engine, wherein:
responsive to determining that the non-SQL function corresponds to an SQL macro that pertains to a scalar expression:
retrieving a return string from the non-SQL function corresponding to the SQL macro,
processing the return string to construct at least a select statement that is configured to select referenced content from a corresponding table, and
replacing the non-SQL function in the SQL query with the select statement that is configured to select the referenced content from the corresponding table; and responsive to determining that the non-SQL function corresponds to an SQL macro that pertains to a table expression:
retrieving a return string from the non-SQL function corresponding to the SQL macro,
processing the return string to construct at least a from statement that is configured to select relevant content from a corresponding table, and
replacing the non-SQL function in the SQL query with a from statement that is configured to select the relevant content from the corresponding table.

12. The system of claim 11, wherein the non-SQL function comprises a table expression.

13. The system of claim 11, wherein the non-SQL function comprises a scalar expression.

14. The system of claim 11, wherein the non-SQL processing engine the SQL processing engine are separate and processing the non-SQL function using the non-SQL processing engine requires one or more remote procedure calls between the SQL processing engine and the non-SQL processing engine, and the replacement SQL function is processed using the SQL processing engine without transmitting a remote procedure call to the non-SQL processing engine.

15. The system of claim 11, wherein the non-SQL function comprises at least a scalar expression that operates on at least a first subset of the table in the database corresponding to the database server, or the non-SQL function comprises at least a table expression that operates on at least a second subset of the table in the database corresponding to the database server.

16. The system of claim 11, wherein determining, by the query processor, whether the non-SQL function in the SQL query is to be converted by the query processor into a form that is processable by the SQL processing engine is based on a type of the non-SQL function that corresponds to at least one of a PL/SQL function, a SQL/PSM function, a Java function or a C function.

17. The system of claim 11, wherein a SQL query optimizer optimizes the SQL query having the replacement SQL function.

18. A computer program product embodied on a computer readable medium, the computer readable medium having stored thereon a sequence of instructions which, when executed by a processor, executes a set of acts comprising:
maintaining a database system comprising at least a database server and a database, wherein the database system processes SQL queries having SQL statements and one or more non-SQL functions against one or more tables in the database based on at least whether corresponding non-SQL functions are to be converted by the database server into replacement SQL functions, the database server includes at least a query processor, an SQL processing engine that processes SQL statements, and one or more non-SQL processing engines that process one or more non-SQL statements; and
receiving an SQL query to be processed inline at the database server and from a database application connected to the database server over a network, wherein the SQL query includes a non-SQL function that specifies an operation on one or more values in a table of the one or more tables, and the query processor determines that the non-SQL function in the SQL query is to be converted by the query processor into a form that is processable by the SQL processing engine based on at least the non-SQL function comprising a scalar expression or a table expression, and processing the SQL query inline at the database server by:

executing, without performing a cross-engine context switch between the SQL processing engine and the non-SQL processing engine, the SQL query by the SQL processing engine, wherein:

responsive to determining that the non-SQL function corresponds to an SQL macro that pertains to a scalar expression:

retrieving a return string from the non-SQL function corresponding to the SQL macro, processing the return string to construct at least a select statement that is configured to select referenced content from a corresponding table, and replacing the non-SQL function in the SQL query with the select statement that is configured to select the referenced content from the corresponding table; and responsive to determining that the non-SQL function corresponds to an SQL macro that pertains to a table expression:

retrieving a return string from the non-SQL function corresponding to the SQL macro, processing the return string to construct at least a from statement that is configured to select relevant content from a corresponding table, and replacing the non-SQL function in the SQL query with a from statement that is configured to select the relevant content from the corresponding table.

19. The computer program product of claim 18, wherein the non-SQL function comprises a table expression.

20. The computer program product of claim 18, wherein the non-SQL function comprises a scalar expression.

21. The computer program product of claim 18, wherein the non-SQL processing engine the SQL processing engine are separate and processing the non-SQL function using the non-SQL processing engine requires one or more remote procedure calls between the SQL processing engine and the non-SQL processing engine, and the replacement SQL function is processed using the SQL processing engine without transmitting a remote procedure call to the non-SQL processing engine.

22. The computer program product of claim 18, wherein the non-SQL function comprises at least a scalar expression that operates on at least a first subset of the table in the database corresponding to the database server, or the non-SQL function comprises at least a table expression that operates on at least a second subset of the table in the database corresponding to the database server.

23. The computer program product of claim 18, wherein determining, by the query processor, whether the non-SQL function in the SQL query is to be converted by the query processor into a form that is processable by the SQL processing engine is based on a type of the non-SQL function that corresponds to at least one of a PL/SQL function, a SQL/PSM function, a Java function or a C function.

24. The computer program product of claim 18, wherein a SQL query optimizer optimizes the SQL query having the replacement SQL function.

* * * * *